(12) United States Patent
Maresko

(10) Patent No.: US 6,817,234 B1
(45) Date of Patent: Nov. 16, 2004

(54) VEHICLE AIR BRAKE TEST SYSTEM

(75) Inventor: William A. Maresko, Mattawan, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/618,904

(22) Filed: Jul. 14, 2003

(51) Int. Cl.[7] .............................................. G01M 17/00
(52) U.S. Cl. ...................................................... 73/121
(58) Field of Search .......................... 73/121, 128, 129; 701/29, 70; 188/1.11 R

(56) References Cited

U.S. PATENT DOCUMENTS

| | | | |
|---|---|---|---|
| 4,050,298 A | | 9/1977 | Hope et al. |
| 5,293,777 A | * | 3/1994 | Reid et al. ................... 73/121 |
| 5,357,800 A | * | 10/1994 | Reuter et al. ................. 73/121 |
| 5,406,837 A | | 4/1995 | Britt |
| 5,488,859 A | | 2/1996 | Britt |
| 5,503,011 A | * | 4/1996 | Hart et al. .................... 73/121 |
| 5,602,482 A | * | 2/1997 | Gutierrez ..................... 324/504 |
| 5,668,314 A | * | 9/1997 | Jones .......................... 73/129 |
| 5,892,437 A | * | 4/1999 | Scheibe et al. ............. 340/467 |
| 2002/0111726 A1 | * | 8/2002 | Dougherty et al. ........... 701/29 |

\* cited by examiner

*Primary Examiner*—Eric S. McCall
(74) *Attorney, Agent, or Firm*—Dykema Gossett PLLC

(57) ABSTRACT

A test system is provided for primary and secondary brakes in a vehicle. The test system includes a two-position combination first valve having a first inlet coupled to a primary air supply, a second inlet coupled to a test air supply, and an outlet coupled to the primary brakes. The test system also includes a two-position combination second valve having a first inlet coupled to a secondary air supply, a second inlet coupled to the test air supply, and an outlet coupled to the secondary brakes. A system selector switch is provided for selectively applying current to one or both of the first and second valves responsive to a test signal input wherein each of the first and second valves directs fluid flow from one of the first and second inlets to the outlet.

10 Claims, 1 Drawing Sheet

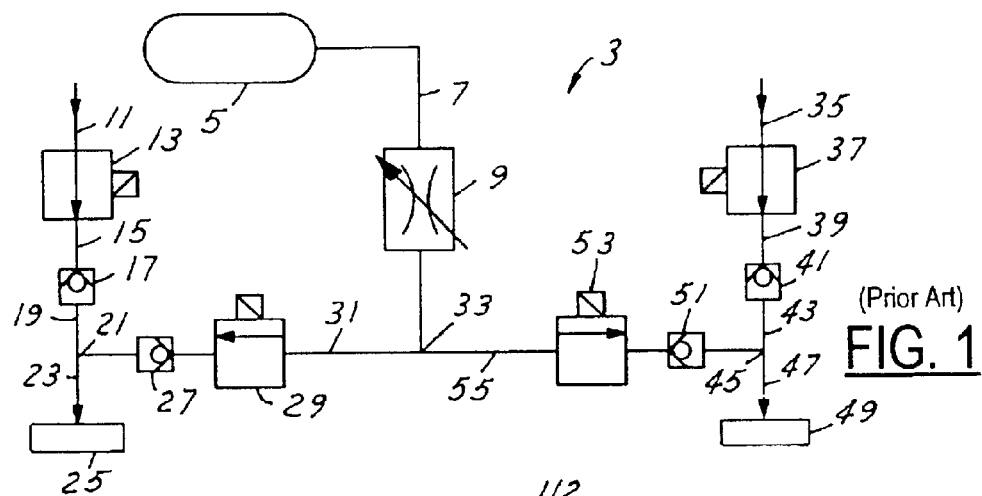
(Prior Art) FIG. 1
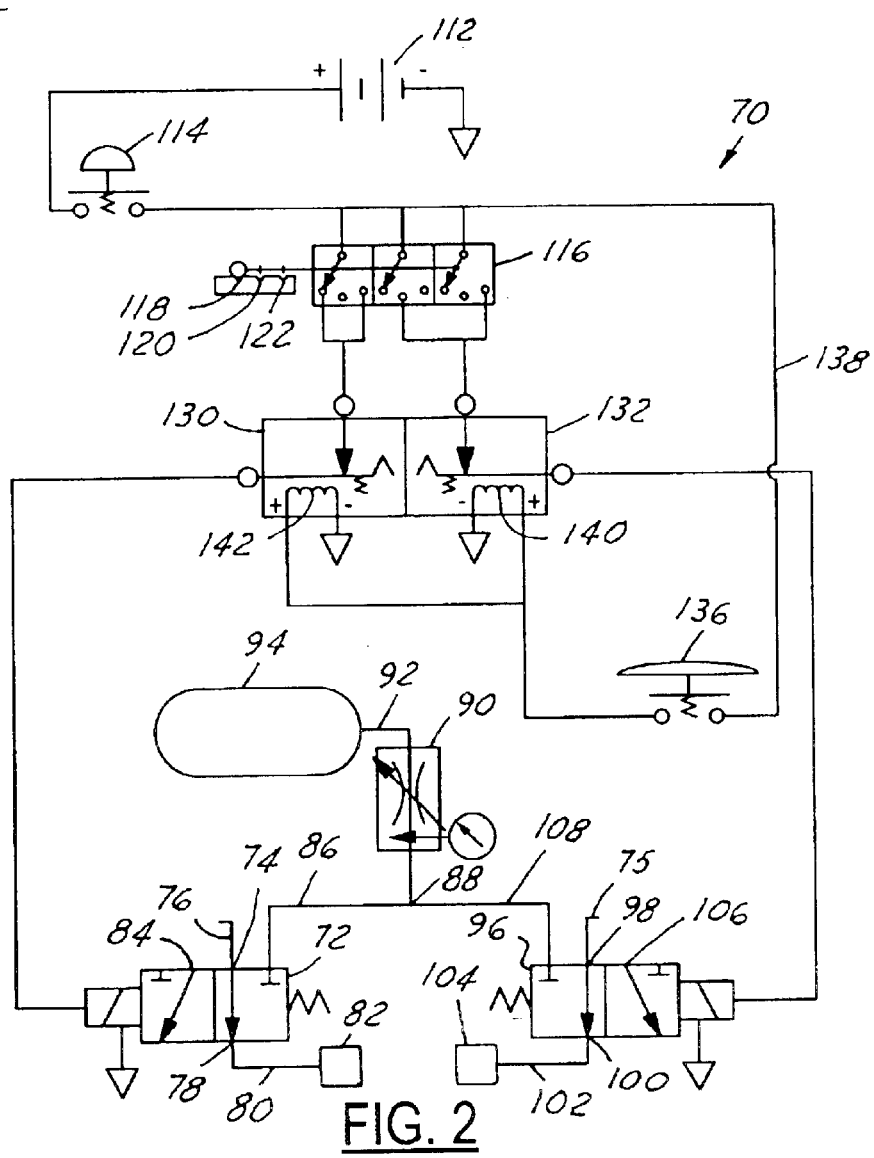
FIG. 2

VEHICLE AIR BRAKE TEST SYSTEM

BACKGROUND OF THE INVENTION

1. Field of the Invention

The present invention relates to vehicle brake test systems and, in particular, to vehicle brake test systems for automotive vehicles, such as trucks having primary and secondary air brake systems.

2. Discussion of Related Art

Large tractor-trailer type trucks have air actuated brakes that are divided into primary and secondary systems. A secondary brake system is typically provided for the directional steering axle wheels of the vehicle. A primary brake system is typically provided for braking the drive axle wheels of the vehicle.

When testing a vehicle with air actuated brakes having a primary and secondary system, it is typically required that the brakes be applied at a consistent set pressure for many successive brake applications or stops. The air brake system must typically be tested while functioning under a wide pressure supply range. The pressure supply range can easily vary between 5–120 psi.

It is also often desirable that the vehicle brake system be tested utilizing only the secondary brake system or the primary brake system. Often, the brake system of vehicles is tested in a real life environment on an outdoor test track. When the vehicle is tested at low air pressures, the vehicle's deceleration is at a slower pace with expanded stopping distances. During a slow pace deceleration, unanticipated events may occur, which require immediate emergency override of the system, such as a deer or another test vehicle in the vicinity. If an unanticipated event does occur, it is desirable to allow the vehicle operator to immediately utilize the brakes at their maximum capacity.

SUMMARY OF THE INVENTION

To make manifest the above delineated and other desires, a revelation of the present invention is brought forth. In a preferred embodiment, the present invention provides a test system for a vehicle having primary and secondary air brakes.

A first valve is provided. The first valve has a first inlet coupled to a primary air supply and a second inlet coupled to a test air supply. An outlet of the first valve is coupled to the brakes of the primary brake system of the vehicle.

A second valve is provided. The second valve has a first inlet coupled to a secondary air supply. The second valve also has a second inlet coupled to the test air supply. The second valve has an outlet coupled to the brakes of the secondary brake system of the vehicle.

A system selector switch assembly is provided. The system selector switch assembly selectively provides current to one or both of the first and second valves responsive to an operator input wherein each of the first and second valves directs fluid flow from one of the first and second inlets to the outlet.

There is additionally provided an override switch which will cause the first and second valves to couple their first inlet with their outlet, regardless of a selected position of the selector switch assembly. The override switch will typically be actuated by the operator of the vehicle utilizing the brake pedal (commonly referred to as the treadle).

Advantages of the present invention will be further explained as the invention is revealed in the accompanying drawings and detailed description.

BRIEF DESCRIPTION OF THE DRAWINGS

FIG. 1 is a schematic view of a vehicle air brake test system prior to the present invention.

FIG. 2 is a schematic view of a vehicle air brake test system according to the present invention.

DETAILED DESCRIPTION OF THE INVENTION

Prior to the present invention, a vehicle test system 3 included an air tank 5. The air tank 5 is connected to an air line 7, which is in turn connected to a pressure regulator valve 9. An air line 11 is provided. The air traveling through air line 11 is controlled by a primary treadle (not shown). The source of the air flowing through the air line 11 is the air tank 5 via the vehicle brake treadle valve (not shown).

Air from the air line 11 is controlled by a ball valve 13. The ball valve 13, which is preferably electrically or, in other cases manually actuated, is connected to an output air line 15. Output air line 15 is connected to a reverse-flow check valve 17. Check valve 17 is connected to an air line 19. Air line 19 is connected with a teed connection 21. The teed connection 21 is connected to a primary brake apply line 23. The apply line 23 is connected to a brake chamber 25 of the primary brake system. The teed connection 21 is also connected to a first test air supply check valve 27. The check valve 27 is fluidly connected to a normally closed ball valve 29. The ball valve 29 is fluidly connected to an air line 31, which is teed to the outlet of the regulated supply 33.

In a manner similar to that aforedescribed, an air line 35 is connected to a normally open ball valve 37, which in turn, connects to an air line 39. The air line 39 is connected to a reverse flow check valve 41. The check valve 41 is connected to an air line 43. The air line 43 is connected with a teed connection 45. The teed connection 45 is connected to an air line 47. The air line 47 is connected to the brake chambers 49 of the secondary brake system. The teed connection 45 is connected to a check valve 51, which is connected to a normally open ball valve 53. The ball valve 53 is connected with an air line 55, which is teed to the outlet of the regulated supply 33.

The air line 35 is controlled by the vehicle secondary treadle and is supplied with pressurized air from the air tank 5 through the normal vehicle air system (not shown). When a vehicle operator utilizes the brake test system 3, the ball valves 13, 37 have to be actuated to a closed position or, if manual ball valves are provided, have to be manually switched to the closed position.

If it is desirable to test the primary brake system, the system selector switch will control ball valve 29 to open while simultaneously controlling ball valve 13 to close when the regulated apply switch is actuated. If it is desirable to test the secondary brake system, the system selector switch will control ball valve 53 to open while simultaneously controlling ball valve 37 to close when the regulated apply switch is actuated. If it is desirable to test both the primary and the secondary brake systems together, the system selector switch will control both ball valves 29 and 53 to open while simultaneously controlling ball valves 13 and 37 to close.

It should be noted that many standard ball valves are configured to exhaust the high-pressure side when the valve is in a closed position. Accordingly, check valves are required so that regulated pressure does not flow backwards through the exhaust of the closed ball valve during a regulated pressure or normal braking operation.

The brake test system 3 does not provide an emergency override to reconnect the primary treadle valve and the secondary treadle valve with the primary and secondary brake systems in an emergency brake operational situation.

Referring to FIG. 2, a vehicle air brake test system 70 according to the present invention is provided. Test system 70 has a two-position combination first valve 72. The first valve 72 is spring biased to a position wherein its first inlet 74 is coupled to the primary treadle air line 76. The first valve 72 has an outlet 78 which is connected to an air line 80, which is connected to brake chamber 82 of the primary brake system.

When energized to a nonbiased position, the first valve 72 will connect its second inlet 84 to its outlet 78. The second inlet 84 is connected to an air line 86, which through a teed connection 88, is connected to a variable pressure regulator valve 90. The valve 90 is connected via line 92, to the vehicle air tank 94.

A two-position combination second valve 96 is provided. In a manner similar to that of the first valve 72, the second valve 96 is biased to place a first inlet 98 in a coupled position with outlet 100, which is connected to an air line 102 which is fluidly connected to brake chambers 104 of the secondary brake system. The first inlet 98 is coupled to a secondary treadle air line 75. The valve 96 also has a second inlet 106 that can place its outlet 100 in a fluid connection with an air line 108, which is further connected to the teed connection 88.

The vehicle battery 112 is utilized to electrically actuate the valves and apply the brakes when the regulated test air apply switch 114 is activated. The switch 114 is electrically connected to a system selector switch assembly 116. The assembly 116 is responsive to a selector input, placing it in a first position 118, second position 120, or third position 122.

In first position 118, the system selector switch 116 actuates the first valve 72 in a position to connect the first valve second inlet 74 to the brake chambers 82 of the primary brake system.

In second position 120, the system selector switch 116 connects the second valve 96 to place its second inlet 98 in fluid connection to the brake chambers 104 of the secondary brake system, while the first valve 72 is in its biased position, wherein the first inlet 74 is in fluid communication with the brake chambers 82 of the primary brake system.

In third position 122, both the first and second valves 72, 96 will be moved to connect their respective second inlets 84, 106 with the test air supply provided by the regulator valve 90.

The system selector switch assembly 116 electrically actuates the first valve 72 via a first emergency override relay 130. A second emergency override relay 132 controls current flow to the second valve 96.

In operation, as mentioned previously, when the system selector switch is in the first position 118 or third position 122, the primary brake system is in fluid connection to the test air supply which flows through the regulator valve 90. In the second position 120 or third position 122, the secondary brake system is in fluid connection to the test air supply which flows through the regulator valve 90.

Typically, the operation of the system selector switch 116 will be responsive to an operator input. The test system will only be activated by actuation of the regulated test air apply switch 114. The pressure regulator is adjusted by the vehicle operator inside the vehicle's cab.

Typically, the vehicle operator will be assigned to make a predetermined number of brake stops at a defined pressure. These stops will occur automatically at the selected air pressure by initiating the switch 114. Closing switch 114 also supplies current to the right hand terminal of the emergency disable switch assembly 136 via an electrical line 138.

In an emergency situation, as the emergency disable switch assembly 136 is closed, relay coils 140, 142 are activated, thereby open-circuiting emergency relays 130, 132. The energized valves 72, 96 or both, depending on the position of the selector switch, are de-energized returning them to their normal position connecting their respective first inlets 74, 98 to the normal brake apply pressure lines provided by air line 76 and air line 102 and normal operation of the secondary and primary brake systems will be effected.

Typically, the switch assembly 136 will be operatively associated with the brake pedal of the vehicle so that the normal operator action will cause the activation of the disable switch assembly 136.

An embodiment of the present invention has been shown. However, it will apparent to those skilled in the art of the various modifications which can be made to the present invention without departing from the spirit or scope of the invention as it is encompassed by the following claims.

What is claimed is:

1. A test system for primary and secondary brakes in a vehicle, comprising:
   a two-position combination first valve having a first inlet coupled to a primary air supply, a second inlet coupled to a test air supply, and an outlet coupled to said primary brakes;
   a two-position combination second valve having a first inlet coupled to a secondary air supply, a second inlet coupled to said test air supply, and an outlet coupled to said secondary brakes;
   a system selector switch assembly for selectively providing current to one or both of said first and second valves responsive to a test signal input wherein each of said first and second valves directs fluid flow from one of said first and second inlets to said outlet.

2. A test system as described in claim 1, further including a pressure regulator valve to regulate the pressure of said test air supply.

3. A test system as described in claim 2, wherein said regulator valve is adjustable.

4. A test system as described in claim 1, further including an emergency override switch assembly to cause one of said first or second valves to couple said first inlet to said outlet regardless of a position of said system selector switch.

5. A test system as described in claim 4, wherein said override switch assembly causes both of said first and second valves to couple said first inlet to said second outlet.

6. A test system as described in claim 4, wherein said emergency override switch assembly is electrically actuated.

7. A test system as described in claim 6, wherein said emergency override switch assembly includes a relay.

8. A test system as described in claim 4, wherein said override switch assembly is actuated by movement of a brake treadle.

9. A test system as described in claim 1, having a regulated air apply switch to provide activation of said system selector switch.

10. A test system for primary and secondary brakes in a vehicle, comprising:
    a two-position combination first valve having a first inlet coupled to a primary air supply, a second inlet coupled to a test air supply, and an outlet coupled to said primary brakes;

a two-position combination second valve having a first inlet coupled to a secondary air supply, a second inlet coupled to said test air supply, and an outlet coupled to said secondary brakes;

a system selector switch assembly for selectively providing current to one or both of said first and second valves responsive to an operator input, wherein each of said first and second valves directs fluid flow from one of said first and second inlets to said outlet;

an adjustable air regulator regulating the pressure of said test air supply; and an emergency override switch assembly actuated by a treadle to cause said first and second valves to couple said first inlets to said outlets regardless of a position of said system selector switch assembly.

* * * * *